D. M. Cook's Electric Battery.

No. 113399. Patented Apr. 4 1871.

Witnesses.

Inventor
D. M. Cook
by
Mason, Fenwick & Lawrence

United States Patent Office.

DANIEL M. COOK, OF MANSFIELD, OHIO.

Letters Patent No. 113,399, dated April 4, 1871.

IMPROVEMENT IN ELECTRIC BATTERIES FOR TELEGRAPHING AND OTHER PURPOSES.

The Schedule referred to in these Letters Patent and making part of the same.

*To all whom it may concern:*

Be it known that I, DANIEL M. COOK, of Mansfield, in the county of Richland and State of Ohio, have invented a new and useful Electric Battery for use in Telegraphing and other purposes where electricity is required; and I do hereby declare that the following is a full, clear, and exact description thereof, reference being had to the accompanying drawing making part of this specification, in which—

Similar letters of reference indicate corresponding parts in both figures.

Figure 1:
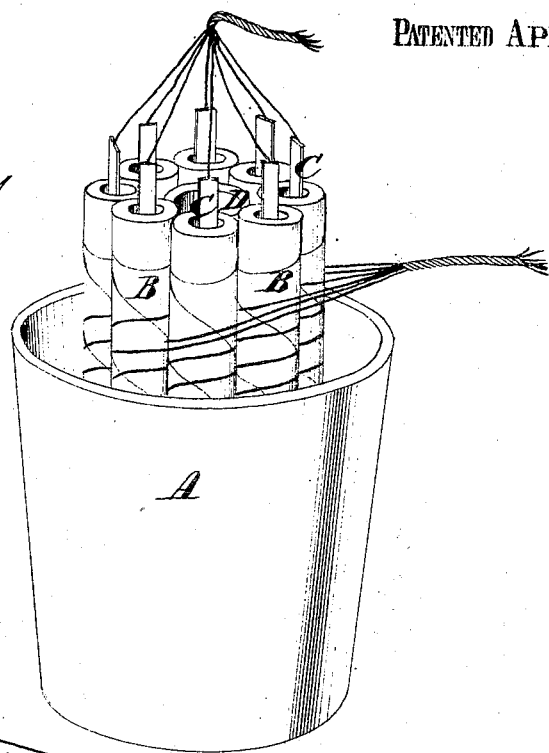
Figure 1 is a perspective view of the battery.
Figure 2:
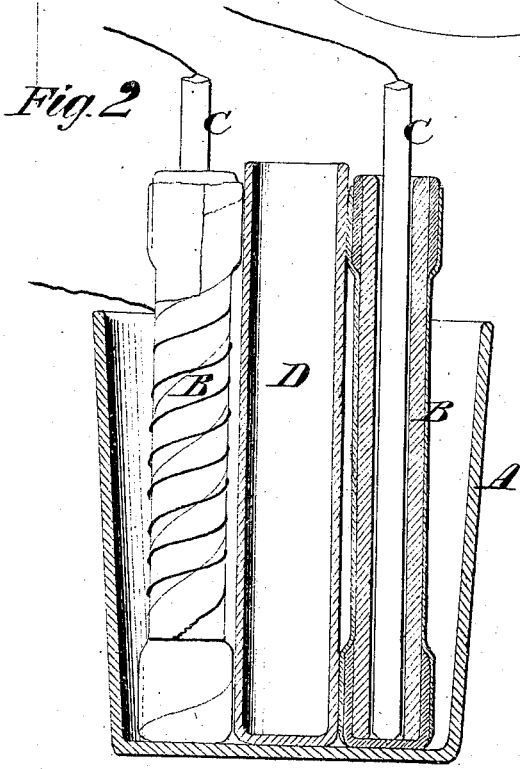
Figure 2 is a vertical central section through the same.

In the construction of an electric battery it is well known that, in order to obtain a large quantity of electricity, large positive and negative-plates are employed, and where intensity is required the series is increased, the quantity remaining the same.

The object of my invention is—

First, to increase the electric quantity with the tension to any desired amount, and thereby greatly lessen the cost of obtaining the electric quantity;

Second, to lessen the quantity of the negative element used in the construction of electric batteries; and Third, to secure a long and steady action and current.

The nature of my invention consists in doubling the electric quantity of one element or pair of positive and negative-plates or parts on the electric quantity of two or more equal elements or parts; that is to say, if two or more equal elements measure a given quantity, the addition of one or more equal elements will increase the quantity to double that amount, and the sum of their combined quantities be 1, 2, 4, 8, 16, 32, 64, and so on to the end of the series. In other words, if there are ten, fifteen, or twenty, or more equal elements, the electric quantity will increase with the tension until the final quantity will equal the first quantity doubled ten, fifteen, twenty, or more times on the quantity of a single element.

My invention may be said to consist of a series of two or more electric batteries so connected that the electric quantity of one battery will double the quantity of two or more similar batteries.

The following is a description of my invention:

In carrying the invention into effect I do not confine myself to any particular form, size, or material, nor to any definite combination of positive and negative materials; but I prefer to use a solution of sulphate of copper of suitable strength, according to the strength of the current required. I may use nitric acid instead of sulphate of copper, or nitro-sulphuric acid, with suitable cups and negatives. Any kind of solution may be used, provided there is a proper arrangement of the parts constituting the battery.

I use a porous cup, B, made of "bonnet-board" one, two, three, or more ply thick, which is made by rolling it up and wrapping the roll or tube with thread. On each end is a rim for the purpose of allowing the cups to be fastened in a bundle and yet leave spaces between them for the free circulation of liquid. One end of each cup B is closed by dipping it into any resinous compound, such as resin and beeswax. This is not necessary when only a single liquid is used. The upper end of each cup may be protected from injury by coating it with resin, and if desired other parts of the cups may be similarly coated, for reducing the action and for greater economy.

These cups B may be made of any size or shape, and they may be made of wood; but for acid or acid solutions it is necessary to use porous earthen cups or cells, and for economy and constancy of action the cups may be made more or less impervious to the action of the liquids used. This is a great source of economy in the construction of batteries for telegraphing for electric lights and for other purposes where high-tension currents are admissible.

Where the solution of sulphate of copper is used the cups B are wrapped with a helix of copper wire, instead of being surrounded by a cylinder of copper. This is for the purpose of allowing a free contact of the liquid with the cups, as well as affording economy in material used; besides, the wire helices will occupy less space.

It is well to wrap each cup B with cloth, to serve as a support to the body of the cup, and also as an insulator between the positive and negative parts, and to prevent contact between the body of the cup and the wire around it.

The imperviousness of the cups may be such that a single element will yield only the one fifty or one hundred-thousandth part required as the sum of the compound battery; that is to say, if the required amount of current from a battery is, say, sixty-four thousand, then it is only that one element shall yield one—that amount doubled on itself seventeen times, by seventeen elements, gives the required amount.

A sufficient reduction of the quantity of each element can be effected by the following methods, namely: First, by the imperviousness of the cups; second, by the size of the cups or cells and reservoir; third, by the strength of liquids used; fourth, by the size of the positive-plate; and the size of the negative-wire or plate does not affect the quantity materially in most negative solutions.

In the use of nitric-acid solution or other solutions, platinum-wire or gilded-copper wire are used instead of cylinder or plates of platinum, as they will yield nearly the same quantity of current.

A number of these cups—ten, fifteen, thirty, or more—is immersed in the same liquid, but each cup may be put in a separate liquid, and into each cup is put a zinc pin or plate, C.

All the negatives and positives are connected as one element, and these I term a base, from which the ultimate quantity is determined—when the quantity of a single element is known and when the extension of the series is sufficient to carry the doubling quantity of the base. The negatives should surround the positive-pin or plate when the cups are all arranged in the same liquid, as the reverse will not act properly.

The reservoir D, placed in the center of the cluster of cups B, is for the purpose of holding the sulphate of copper or an acid solution, and allowing it to be taken up by the liquid surrounding the cups, and thereby keep up the supply to the liquid and save attendance. The reservoir D is also partially closed or made more or less impervious to the liquids for the purpose of rendering the action economical and continuous and reducing it more or less.

The object of using bonnet-board cups is mainly convenience and cheapness, for in the use of sulphate of copper these cups are very durable, as the salt has a preservative effect upon them.

The cups are cleansed by lifting them out of the liquid and immersing them in clean water, and the deposit of copper on the negatives may be removed by dipping them in a solution of bichromate of potash and sulphuric acid. In weak solutions there will not be a deposit on the negatives.

The arrangement for tension and the action in this battery is similar to well-known batteries, except that the decomposition of zinc is not in proportion to the quantity of the current produced, but is in proportion to the number of elements constituting the base and the extension of the series for tension; for though a single element will, by its combination with other elements, yield, say, one hundred times its separate quantity, yet the decomposition is not perceptibly increased.

The mode of using or applying the currents thus generated is the same as from the common battery.

Having described my invention,

What I claim as new, and desire to secure by Letters Patent, is—

1. The improved battery herein described, composed of a series of cups, B, arranged in a vessel, A, the separate positives and negatives being connected, as and for the purposes herein set forth.

2. The combination of the series of cups B and reservoir D, substantially as set forth.

3. The cups B, with wire coils applied, substantially as described.

4. The cups B, constructed and arranged substantially as set forth in the above specification.

D. M. COOK.

Witnesses:
J. BRUCE,
V. GUTZWILER, Jr.